Figure 1:
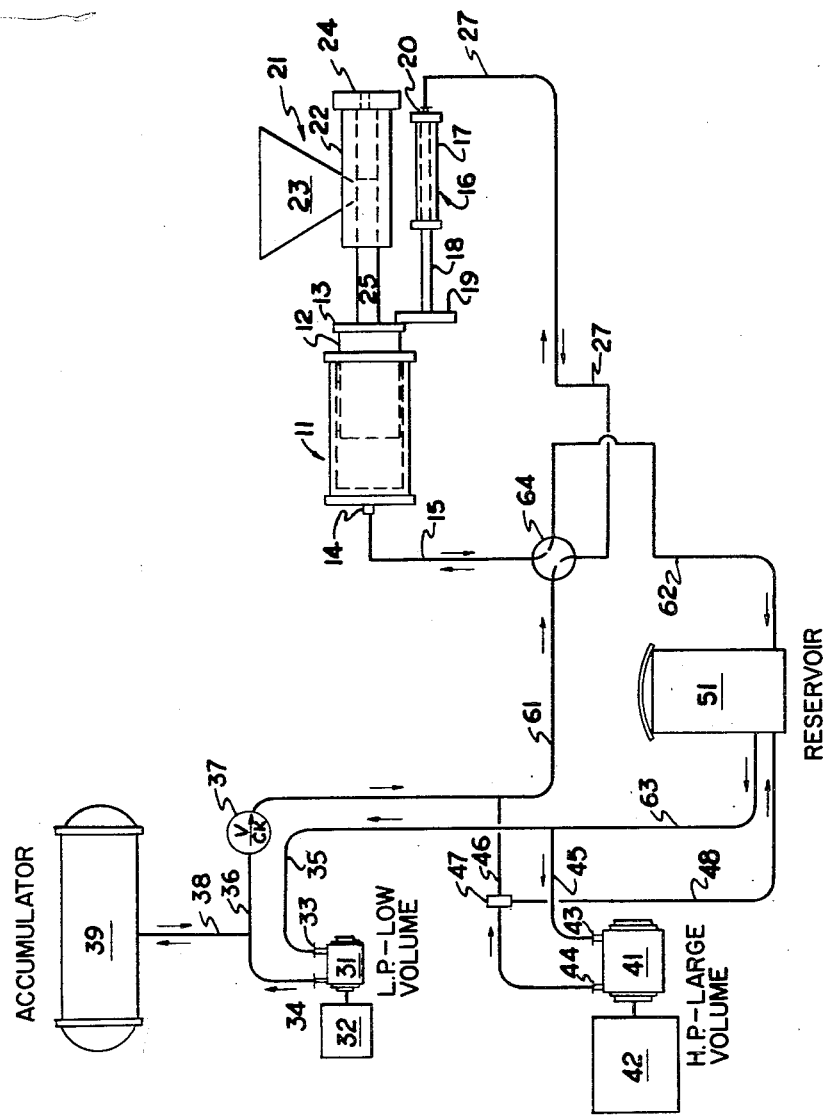

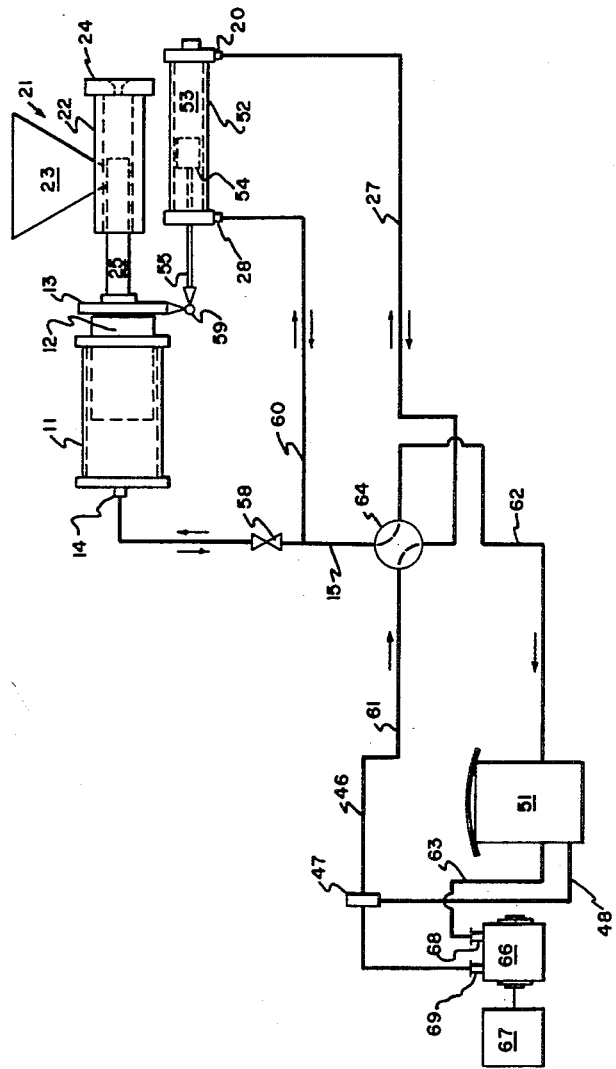

United States Patent Office 2,963,865
Patented Dec. 13, 1960

2,963,865
CYCLIC EXTRUSION APPARATUS

Henry A. Thomas, Baton Rouge, La., assignor to Ethyl Corporation, New York, N.Y., a corporation of Delaware Filed July 7, 1959, Ser. No. 825,456
4 Claims. (Cl. 60—51)

This invention relates to apparatus for extrusion of various materials. More specifically, the invention relates to a new and improved extrusion apparatus including an extruder of the reciprocating or plunger type, that is, of the type wherein a charge of the material to be extruded is forced in a batchwise manner through an appropriate extrusion die to form the desired shapes. The invention further relates to an extruder of the character cited plus a novel hydraulic actuating system combination therewith. This application is a continuation-in-part of Serial No. 627,237, filed December 10, 1956, now abandoned.

The general art of extruding various materials is fairly well established. The types of materials processed by this unit operation include a diversity of materials such as macaroni paste, cookie dough, ceramic mixes and metallic shapes. Generally, the apparatus for effecting extrusion operations are of two general types, viz: continuous screw type extruders and ram type extruders. Generally, ram type extruders offer certain inherent advantages which it is not essential to discuss at this point. In operation of virtually all ram type extruders, the material being processed is maintained in a melted or plastic state during the extrusion operation. In the case of metals, the extrusion operation is carried out at or above the melting point of the metal involved.

Generally, in the operation of ram type extruders, the speed of operation is not particularly significant because the extrusion ratio—viz., the cross sectional ratio of the extrusion chamber to the extrusion die—is sufficiently great that the movement of the plunger or ram within an extruder body is not necessarily particularly rapid. In addition, inasmuch as the materials processed are generally maintained in a melted or plastic state, the pressure plied by the extrusion plunger is transmitted throughout the mass of the material according to established hydraulic principles. The implication of this is that a large batch charge can be employed, resulting in a large output of extruded product per batch operation. Under these circumstances, the lateral movement of the extruder ram, by lateral meaning the movement along the length of the extrusion chamber, is not a particularly important factor. Further, the pressures of extrusion of most materials heretofore processed have not been significantly great.

It has recently been found that various particulate systems containing finely divided relatively soft metals can now be successfully extruded for various purposes. More specifically, it has been found that sludges including a subdivided solids phase predominantly consisting of metals such as lead metal, and a liquid phase which may predominate in an aqueous material, can be successfully processed by extrusion to yield a compacted solid product and in addition a segregated recovered liquid phase. It has further been discovered that this process is particularly advantageous in the extrusion of lead containing sludges such as result from the manufacture of various organometallic compounds, in particular, tetraethyllead.

The object of such operations is to accomplish a dual result of preparing the predominantly lead solids material in a form which is particularly suitable for subsequent smelting recovery, and in addition to segregate and recover the liquid phase component. Accordingly, the object of this type of operation is appreciably different than in extruding, for example, a pure metal or an alloy in appropriate shapes for subsequent mechanical usages.

In effecting these operations it has been found highly advantageous to not exceed a particular extrusion ratio. In other words, it is found particularly desirable to not employ an extrusion die which is quite small compared to the cross sectional area of the extruder barrel or chamber.

Thus, in effecting operations of the foregoing type, it is not advantageous to achieve a high overall production by the mere expedient of increasing an extrusion ratio and supplementing this by providing a quite lengthy initial charge for each extrusion cycle. Rather, it has been found that the most effective results are provided by the extrusion of batches of relatively modest size for any particular cycle. In addition, it is normally desired to provide a fairly low extrusion ratio, for example of the order of about 4:1 to 50:1. Under these circumstances, it has been found that the overall effectiveness of such an operation is greatly limited by the more frequent retraction of the extrusion ram to permit the charge of a fresh batch, or portion of a batch, of material to the extrusion chamber. It might be expected that the appropriate remedy for the capacity of a particular machine would be merely to increase the volume delivery capacity of the pumps or hydraulic system forcing the hydraulic liquid to actuate the extruder during the working cycle, or the extrusion stroke of the extruder plunger. Unfortunately, this is not the situation. It has been discovered that materials of the wet sludge type discussed above are processed at almost a uniform extrusion pressure for a given extrusion ratio and within a certain range of ram speeds. The preferred range of ram speeds is, however, relatively low. A further limitation on this type of extrusion is that the total length of a ram stroke, for an extrusion batch, should be fairly moderate. A further requisite of the powering system for actuating the extrusion process is that positive movement must be supplied. In other words, using hydraulic liquid as the powering medium, positive displacement pumps driven by constant speed motors must be used.

In addition to the foregoing factors, it was also discovered that superior results could be achieved by preceding an actual extrusion stroke with a number of relatively low pressure charging strokes. By charging strokes is meant that small portions of the loose, flowable wet sludge are pushed into place in the extrusion barrel in sequence. The pressure applied during such charging is very moderate, or far below the pressure required for extrusion. As a result of these charging strokes, the extrusion chamber is fully loaded before extrusion is actually commenced. This provides the largest actual extrusion for a single cycle.

The foregoing preferable conditions and limitations in extrusions of wet metals containing sludges, results in relatively frequent necessity of retracting the extrusion plunger and recharging the extrusion chamber. Hence, in practice, it has been found that a much larger number of cycling strokes (including strokes toward the extrusion die and retracting stroke) is necessary for this type of operation than for conventional extrusions. Further, it is highly undesirable to provide a hydraulic pump supply system having a capacity far in excess of that which can be utilized by the extruder at the "plateau" pressure of extrusion already mentioned. Accordingly, heretofore, the time to which a given extrusion cycle could be reduced was greatly limited by the fact that the volume rate of delivery of hydraulic liquid during a retraction was substantially the same as the delivery rate during a working stroke. Hence, even though a retracting step in the cycle was not against a resisting pressure, the speed of accomplishing that retraction was limited by the volume rate of liquid supplied to power the extrusion device during the working stroke.

From the foregoing, it will be apparent that a great need exists for an extrusion apparatus in combination with a hydraulic system which would provide a cycling operation wherein the retraction stroke could be accomplished at an appreciably greater rate than the working stroke. Further, it is imperative that this retraction does not necessitate a great increase in maximum capacity, volumetric and pressure-wise, of the hydraulic liquid supply system. In extrusion installations intended for processing certain specific sludge system, it was further desired that a plurality of low pressure working strokes be accomplished at an appreciably faster linear rate than feasible during the final extrusion stroke. As explained above, these low pressure working strokes, or charging strokes, serve to fully load an extrusion chamber prior to actual extrusion.

A principal object of the present invention is to provide a new and improved extrusion apparatus and hydraulic motor system associated therewith. A more specific object is to provide extrusion apparatus and a hydraulic system in combination therewith specifically advantageous for extrusion operations of a rapidly repetitive cyclic character. A more specific object is to provide a hydraulic system in combination with an extruder having integrated means for reducing the cyclic time and in particular the portion of an operation cycle consumed by a retracting stroke or strokes. A further specific object is to provide a hydraulic system employing a plurality of positive displacement pumps for most effectively utilizing prime energy in carrying out the cyclic operation. Still another object of certain embodiments of the invention is to provide an improved extrusion apparatus and hydraulic system associated therewith, specifically, capable of accomplishing rapid low pressure working and/or retracting strokes in conjunction with high pressure lower speed extrusion strokes. A further object is to provide a novel hydraulic system for an extrusion apparatus. Other objects will appear hereinafter.

The invention will be more clearly understood from the accompanying figures, wherein Figure 1 is a schematic representation of a typical embodiment of the invention. Figure 2 is a specific embodiment extending the benefits of the invention during not only retracting strokes but also charging strokes of an extrusion ram, this embodiment also employing a single pressure supply source or pump.

In all forms of the invention a ram type extruder machine is combined with an improved hydraulic motor system. The hydraulic motor system includes at least two actuating rams, these being a main hydraulic ram of relatively large cross section, and at least one supplemental ram of smaller cross section. These rams are aligned in parallel and are operatively engaged to actuate the reciprocable element of the extrusion machine. Liquid supply lines lead to the rams for flow of hydraulic liquid to and from the respective rams, and to and from a hydraulic pressure supply source. The hydraulic pressure source includes means for supplying by positive displacement the hydraulic liquid, at a larger rate for a low pressure supply, and at a smaller rate for a higher pressure supply. In some instances, a single positive displacement pump is employed, and, in other embodiments, a plurality, normally two, of hydraulic liquid pumps of the positive displacement type are employed. Conduits or lines and valve means are required and, frequently, hydraulic pressure accumulators are employed as described hereinafter.

The precise sizing relationships of the pump to the extruder is not highly critical, but is generally important in accomplishing the objects of operation of the invention. The extruder machine proper, in addition to the usual extrusion chamber and accompanying mating plunger, includes a main ram, hydraulically actuated, for forcing the plunger to traverse the extrusion chamber length during a working or extrusion type stroke, plus at least one supplemental ram which is adapted for reverse directional operation to the force motion of the main ram. The purpose of the supplemental ram is to move the main ram and the extrusion plunger during a retraction or "non-working" stroke. In certain preferred embodiments a double acting cylinder-piston replaces the single acting supplemental ram and powers the extrusion plunger during the charging strokes.

In addition to the actuating rams, as already mentioned, the hydraulic motor system includes at least one positive displacement pump, although in certain embodiments two or more are provided. The characteristic of the pump and hydraulic liquid supply to the actuating lines is that a higher rate of flow is provided for actuating the supplemental ram, and at a lower actuating pressure. With either a plurality of pumps or a single pump, positive displacement type pumps are required. If a single pump is used, in addition to providing a positive displacement type operation, it should provide a variable rate of flow dependent on the delivery pressure requirements. In other words, it should deliver a greater quantity of liquid at a low discharge pressure and a smaller quantity at a higher required delivery pressure. One such type of pump is the Variable Volume pump manufactured by Denison Engineering Company, Columbus, Ohio. This pump has means provided for delivery of higher rates of liquid output when the discharge pressure or demand pressure is low. When a plurality of pumps are employed, conventional displacement type pumps are satisfactory.

When two pumps are used in the hydraulic pressure supply, the pumps are usually of different volumetric capacity at the normal operational speed at which they are to run. Because usually a much larger magnitude of force is required for a working stroke, the pump of greater volumetric capacity is employed of a size to move the main ram at the desired pressure of operation and the desired rate for the material being processed. The size of the second driven pump is not as of great importance as the size of the first pump, but is nevertheless important in that it affects the speed of retraction operations as discussed below.

The merits and novelty of the invention arise from the aforementioned extrusion arrangements and the interrelation of the described hydraulic elements. This interrelation is as follows: The pump means deliver liquid at a high pressure, apportioned to a necessary extrusion stroke force, through a high pressure line to a high pressure manifold, which is connected by valve means to supply lines to the several extrusion machine rams. The same valve means provides connection between the ram supply lines and a return low pressure line which generally supplies return liquid to a reservoir. This reservoir is in turn connected to a low pressure line or manifold, which is connected to the intake of the pump means by pump feed lines. The low pressure return line and the reservoir are, in effect, an extension of the low pressure manifold. The hydraulic liquid is delivered to the main ram at the necessary higher pressure for an extrusion stroke, and to the supplemental ram at a higher rate and at a lower pressure for retraction of preliminary strokes.

In a two pump system, both of the pumps deliver liquid through their delivery lines to the high pressure manifold. A special and necessary element in the hydraulic system in such embodiments is a check valve between the second pump delivery line and the high pressure manifold. Between this check valve and the delivery port of the second pump is a branch line to an accumulator. The accumulator, it will be understood, is generally a pressure drum for storing a supply of oil or hydraulic liquid delivered by the second pump at its delivery pressure.

In operation of a two-pump installation, the pumps deliver liquid at two maximum working levels. These delivery pressures are a function of the pump design and also can be varied somewhat by by-pass devices or pressure controllers. The pressure controller of the first pump is set at a level desired for satisfactory working stroke operation of the extrusion machine and the pump is sized to provide about the required flow rate for an extrusion. The pressure controller of the second pump, on the other hand, is set at a somewhat lower pressure. During operation, and during the working strokes of an operating cycle, the hydraulic liquid flows through the high pressure manifold from both pumps, thus resulting in a rapid rate of travel, until the resistance to the main ram movement increases to the point where the pressure is in excess of the delivery pressure of the second pump. At this time, the pressure available from the first pump results in closure of the check valve mentioned and the rate of main ram movement is decreased to correspond to the volumetric flow supplied by the first pump. Concurrently the hydraulic liquid delivered by the second pump is automatically passed into the accumulator mentioned at the delivery pressure described. Upon completion of the working stroke, the valve means are reversed by manual control or, if desired, by suitable automatic control, for a reverse flow of the extrusion machine plunger. This is accomplished by feeding liquid to the supplemental ram mentioned, and allowing discharge of liquid from the main extrusion machine ram back to the reservoir. The retracting stroke is generally accomplished against only the frictional resistance of the working parts of the extrusion machine, and hence does not require a particularly high pressure supply of hydraulic liquids. Accordingly, during the retraction stroke, the volume of liquid supplied to the supplemental ram or rams is the cumulative volume from the first pump, the second pump normal delivery rate plus the quantity supplied by the accumulator. A further feature of the apparatus is that the supplemental rams mentioned are normally of appreciably smaller diameter for working operation than the main ram. The smaller diameter is feasible because, as mentioned, only the inertia and frictional resistance of the extrusion machine parts is overcome during the retracting stroke and hence the area for movement under unit hydraulic pressure utilized by the ram can be smaller than during a working stroke. The corollary of this is that the rapidity of lateral movement of the ram and the extrusion machine plunger is increased for a given volumetric rate of hydraulic liquid flow.

The details of operation of the apparatus will be understood more easily from the following description of Figure 1 which illustrates a specific embodiment of the invention employing two pumps.

Referring to Figure 1, it will be seen that the principal parts of the apparatus include an extrusion machine 21 of the plunger type, a main ram assembly 11, a supplemental assembly 16, a first pump 41, a second pump 31, a reservoir 51, and an accumulator 39.

The extrusion machine includes an extrusion chamber or barrel 22, wherein is mounted for sliding fit a plunger 25. A feed hopper or chute 23 provides for a supply of material to be processed for feeding through a port in the wall of the extrusion machine chamber 22. The end of the extrusion chamber 22 is capped by a die assembly 24, having an aperture therein of smaller transverse area than the chamber proper. It will be seen in operation that movement of the plunger 25 toward the die assembly 24 will force the material charged through the orifice or aperture of the die assembly 24, provided sufficient pressure is exerted.

The main ram assembly includes a conventional barrel with a ram or plunger 12 closely fitted therein for sliding movement in contact with the end of the plunger 25 of the extrusion machine assembly. The ram 12 bears against a heavy plate or platen 13 to sustain the high mechanical forces generated in working operation. Guide rods or bars, not shown, are provided to assure movement of the platen on a straight, horizontal path. Normally, the platen 13 is fastened to the end of the extrusion machine plunger 25. The main ram assembly cylinder is fitted with a hydraulic liquid supply nozzle 14. This joins a supply line 15 for feeding or discharging of the appropriate hydraulic actuating liquid.

The supplemental ram assembly 16 includes a chamber, generally of appreciably smaller transverse dimensions than the cylinder of the main ram assembly, having a plunger or piston 18 slidably positioned therein. A nozzle 20 is fitted to the end of the ram cylinder 17 for joining to a line 27, which is provided to supply or discharge the actuating hydraulic liquid. On the end of the piston or ram 18 of the supplemental ram assembly is a connecting bracket 19 which is attached to or abuts the platen 13 at the end of the main ram proper 12.

It will be seen from the above description, that movement of the main ram 12 toward the extrusion machine will result in forcing material through the extrusion machine die assembly 24, resulting in formation of shapes of the compacted solids portion of the feed material. Concurrently, the supplemental ram 18 will be pushed back in its cylinder 17 by the movement of the platen 13.

Turning to the hydraulic system, supply line 15, to the main ram assembly 11 and supply line 27 to the supplemental ram assembly 16, provide for feed and discharge as required of the actuating hydraulic liquid. The supply lines 15, 27 connect to a valve means 64, which is customarily a "four-way" valve. By this is meant that the valve connects to four conduits and can provide two alternative channels connecting separate pairs of the conduits. Also connected to the valve means 64 are a high pressure manifold line 61 and low pressure return line 62. It will be seen that the valve means can provide for flow of a pressurized hydraulic liquid through either supply line 15 or supply line 27 and accompanying this flow will be a return low pressure flow through either of these supply lines 27 or 15 to the low pressure return line 62.

The first pump system includes a positive displacement type pump 41 having a feed or low pressure nozzle 43 and a discharge or high pressure nozzle 44. A close coupled constant speed motor 42 provides for operation of the first pump 41. A supply line 45 provides for return of hydraulic liquid to the pump, and a delivery line 46 receives the pressurized liquid produced by the pump. The delivery line 46 connects to the high pressure manifold 61. The feed line 45 receives liquid from a low pressure manifold 63. The low pressure manifold line 63 is supplied from a supply of nonpressurized liquid maintained in a reservoir 51 which is a return "sump" receiving liquid from the low pressure return line 62, above mentioned. Positioned in the delivery line 46 is a pressure controller 47 which is desirably of the by-pass or relief type. A relief line 48 is connected to this pressure controlled device and leads to the sump or reservoir 51. In operation, the pressure controller 47 is set at a pressure somewhat above the desired operating pressure of the main ram assembly 11 of the extrusion machine. Thus, if for some reason unanticipated obstructions or blocks are encountered which result in resistance to extrusion which in turn results in a pressure build-up above the desired operating range, the pressure controller 47 vents or releases the necessary quantity of liquid delivered by the positive displacement pump 41 and bleeds it to the reservoir 51.

The second pump 31, also actuated by a close coupled directed connected motor 32, is provided with corresponding intake nozzles 33 and an outlet nozzle 34. A feed line 35 connects to the low pressure manifold 63. A discharge line 36 connects to the high pressure manifold 61. Between the delivery line 36 and the high pressure manifold 61 is a check valve 37, which prevents back flow of hydraulic liquid if the pressure in the manifold exceeds the delivery pressure of the pump 31. A take-off line 38, between the delivery nozzle 34 and the check valve 37 is provided connected to the delivery line line 36, and leading to an accumulator 39. The accumulator is a pressure vessel having a partial inert atmosphere content and being of relatively large volume. In operation, when the pressure in the high pressure manifold 61 is above the delivery pressure of the second pump 31, the volumetric output of liquid by the pump 31 passes through the take-off line 38 to the accumulator and is stored at substantially constant pressure owing to compression of the relatively large volume of the gas therein.

The advantages and beneficial features of the apparatus above described are readily understood from a description of the several portions of an operating cycle. Generally, an operating cycle includes both "working strokes" and "retraction strokes." The working strokes may be occasionally also subdivided into initial compacting strokes and actual extrusion strokes, and in such instances a preferred embodiment, described later herein, is desirably employed. Considering an actual cycle of operation, with reference to the embodiment illustrated by Figure 1, the operation is as follows.

*Operation—Fig. 1 modification*

Both pumps 31, 41 are placed in operation and substantially immediately attain the desired operating pressures. The valve means 64 is illustrated in position for a retraction stroke. However, for a working stroke, the valve 64 is positioned to provide for flow of hydraulic fluid from the delivery line 46 and through the high pressure manifold, then through the valve and the supply line 15 to the main ram 11. This causes ejection of the main ram proper 12, which in turn forces the plunger 25 toward the extrusion end of the extrusion machine 21. The charge for the chamber 22 was previously inserted therein. Concurrent with movement of the extrusion machine ram 25, the contact with the push bracket 19 fastened to the end of the supplemental ram proper 18, causes its movement to the retracted position. At the conclusion of the working stroke—i.e., when the plunger 25 has substantially reached the die assembly 24, the valve means 64 is reversed to the position shown in Fig. 1, allowing the hydraulic liquid from the main ram assembly 11 to be discharged through the supply line 15, the valve means 64, and the low pressure return line 62 into the reservoir 51. This is effected by flow of liquid through the high pressure manifold 61, the valve means 64 and the supplemental ram assembly line 27, thus forcing outwardly the supplemental ram 18, which in turn pushes the main ram 12 back into the main ram assembly, and also retracts the extrusion machine plunger 25, from its position adjacent the die assembly 24. This retraction is continued far enough to allow recharging of the extrusion machine barrel 22 with fresh charge from an appropriate hopper or conduit means 23.

During the period that the working stroke is being accomplished, as already mentioned, the pressure in the high pressure manifold and applied to the main ram assembly 11 is usually, or at least during a part of the working stroke, higher than the delivery pressure provided by the second pump 31. The check valve 37 in this case prevents back flow of liquid, and the hydraulic liquid delivered by the pump 31 is automatically drawn off through the take-off line 38 and accumulated in the accumulator. During the retraction stroke, on the other hand, since the only resistance to movement of the supplemental ram, the main ram proper 12, and the retraction of the extrusion machine plunger 25 is normally the frictional resistances involved, the pressure for movement is not particularly high. Hence, the flow of liquid from the high pressure manifold 61 is an accumulative amount of the delivery from the first pump 41, and the second pump 31 plus a variable amount from the accumulator 39.

It will be evident that the precise working conditions, speed of operation, and other variables of operation can be changed through wide ranges using the apparatus of the invention and the benefits and advantages will be provided in desired degree. Generally in processing materials providing substantial resistance to compaction and extrusion, such as metallurgical sludges or pastes of relatively ductile metals such as lead, a convenient and very suitable working pressure for the delivery pressure attainable by the high pressure pump (e.g. the pressure set by the pressure regulator 47) is of the order of 1000–1500 pounds per square inch. The pressure maintained by the second pump 31 can also be varied appreciably but is usually significantly below the delivery pressure set for the first pump. Thus a delivery pressure of the order of from 500 pounds per square inch up to a pressure approaching the first pump setting, is highly suitable for the second pump 31.

The timing of operation of the several strokes is of course a function depending upon numerous variables. Not only does the resistance to extrusion of the material processed affect the operation, but of course the relative volumetric capacities of the main ram assembly 11 and of the supplemental ram assembly 16 affect these factors. In a typical embodiment, using a main ram having a diameter of about 10 inches and a stroke of about 15 inches, the supplemental ram diameter was about 2 inches with an equal stroke. In this specilc embodiment the volumetric capacity of the first pump was about 20 gallons per minute, and of the second pump about 14 gallons per minute. Operating this embodiment with a pressure settin gof 1200 pounds per square inch for the first pump and a pressure setting of slightly less for the second pump, operating cycles of the order of 30–50 seconds for a full cycle were attained.

The control means for the apparatus include, of course, the usual switches or controllers for the motors for the pumps. In addition appropriate automatic means, or manual control, can be employed to actuate the valve means 64.

As previously mentioned, an object of specific embodiments is to provide appropriate capability of rapid cycling not only on the retraction strokes of the extrusion ram, but also on working strokes of the feeding type. As previously stated, with some systems of material to be processed, it has been found highly desirable to provide a plurality of low pressure "working" strokes prior to an extrusion stroke. These low pressure strokes, in the same direction as an extrusion stroke, accomplish the function of providing a full charge of an extrusion chamber prior to an extrusion stroke. This operation conserves greatly the time of operation of the main ram device which actuates the extrusion plunger during the actual extrusion.

An extrusion machine and associated hydraulic ram or cylinder-piston devices, employed in this embodiment of the present invention, is shown in Figure 2. This embodiment also employs a single pump means for the supply of hydraulic liquid at desired pressures.

Referring to Figure 2, only the portions of the apparatus which appreciably differ from the embodiment of Figure 1 are shown. This portion includes again the extrusion machine 21 and associated therewith a main ram assembly 11, and a double acting cylinder-piston unit 52. As in the preceding example, a valve means 64 provides a connection between a low pressure return line 62 and a high pressure manifold 61. A supply line 15 again is connected to the valve means 64 and connects to the nozzle 14 of the main ram assembly 11.

The double acting cylinder-piston unit 52 includes a cylinder 53 with nozzle connections at both ends. The unit includes also a piston 54 having a projecting piston rod 55 which is connected to the slidable platen 13 by a pin connection 59. The platen 13 is attached to the end of the extrusion machine plunger 25, and makes contact with the ram 12 of the main hydraulic ram dependent upon the positions of said ram 12. Thus, it will be seen that the plunger 25 is capable of being reciprocated in the extrusion chamber 22 by the action of the double acting unit 52.

As stated above, two nozzle connections for the hydraulic liquid are provided for the double acting cylinder 53, these including a "retraction stroke" feed nozzle 20 through which liquid is introduced when the piston 54 is to be moved to retract the platen 13 and plunger 25 out of the extrusion chamber 22. The second or "feed stroke" nozzle 28 provides for feed of hydraulic liquid when movement of the piston 54 is desired to cause the plunger 25 to move toward the die assembly 24. The hydraulic liquid for the feeding stroke of the double acting piston 54 is provided through a supply line 60 connecting with the supply line 15 to the main ram assembly 11. A valve 58 is also provided in the supply line 15, this valve being positioned between the entry or nozzle 14 to the main ram 11 and the connection made with the supply line 60 to the double acting unit 52. It will be apparent that closure of the valve 58 will permit independent action of the piston 54 of the double acting unit 52 (and hence movement of the plunger 25) while the main ram 12 is immobilized.

A single pump 66 is provided in this instance, of the positive displacement type, but having a variable delivery rate whereby a relatively low delivery is provided at the high pressure required for maximum working stroke forces by the main ram 12, and a high delivery is provided at the low pressures required. The pump is provided with a return nozzle 68 and a delivery nozzle 69, and is driven by a constant speed motor 67.

*Operation—Fig. 2 modification*

The interrelation of the parts and subassemblies of this embodiment will be clear by describing the cyclic operation. Initially, the chamber of the extrusion machine 21 is empty. The main ram 12, in its free retracted position is immobilized by closure of the valve 58. Flow of liquid through the valve 64, and supply lines 15, 60 to the feed stroke nozzle 28 of the double acting unit 52 will result in movement of the plunger 25 toward the die plate 24, this action carrying forward the material which has dropped into the chamber 22 from the hopper 23. Upon completing this forward or feed stroke, the valve means 64 is reversed to the position shown in Fig. 2, with corresponding reversal of hydraulic liquid flow, and the piston 54 (and, of course, the plunger 25), will move in a direction away from the die assembly 24. Upon the ram 25 passing the opening between the hopper 23 and the extrusion chamber 22, more feed material will be admitted by gravity flow. An additional working or feeding stroke will again transport the material thus introduced as far toward the die plate as can be achieved by the force exerted by the double acting piston 54. Several repetitions of this sequence will normally be made, until the chamber 22 is substantially filled, with slightly compacted feed material, up to the point of opening to the hopper 23. At this time, the closure 58 is opened, allowing the high pressure liquid to flow to the main ram assembly 11, forcing the main ram 12 against the platen 13 and initiating an extrusion stroke of the plunger 25.

In this embodiment, as in embodiments employing two pumps, the volumetric flow of hydraulic liquid, during the reciprocation of only the piston 54 of the double acting cylinder 53, is at a substantially greater rate than during the actuation of the main ram assembly 11 in a working stroke. Illustrating the reduction in operating time, when the double acting cylinder has a diameter proportion to the main ram of 2:15, the rate of linear travel of the plunger 25 will be 56 times as fast, with a uniform hydraulic flow rate. This is further multiplied by the greater flow rate obtained from the pump at the lower pressures required. Thus, the linear rate of travel during the feeding strokes and retraction strokes are typically about 100 times the rate of travel during an extrusion stroke. The important benefits of this increase in rapidity are clear.

In a further refinement of the apparatus of this embodiment, the valve 58 can be made automatically responsive to a position of the extrusion plunger 25. Thus, after a plurality of feeding strokes as above described, the plunger 25 will move only a minor distance toward the die assembly 24. If, then, a specific point is not attained, means can be provided responsive to such positional non-attainment, to signal and initiate opening of the valve 58. Upon opening of this valve, then, during the necessary working stroke, hydraulic liquid will flow to the main ram assembly 11, as well as through the supply line 60 to the working stroke nozzle 28 of the double acting unit 52. This will result in a greater multiplication of the pressure applied to the plunger 25, this multiplication existing both from the higher pressure available from the pump 66 as well as from the increased ram area provided by the main ram 12.

It will be apparent that, instead of the single pump hydraulic pressure supply source described in the embodiment of Fig. 2, the two pump supply source of the embodiment of Fig. 1 can be used.

Certain additional refinements and alternatives in the apparatus above described wil be readily available without altering the substance of the invention. One particular additional feature which is highly desirable is the employment of not only one but two supplemental ram assemblies corresponding to that described. In this instance the supplemental rams are attached to the platen actuated by the main ram proper at the ends of, usually a symmetrical line or a diameter across the platen. This attachment assures alignment of the parts and prevents any tendency to skew the ram being moved. Further, as already described above, in many instances double acting cylinder piston units are employed as the supplemental rams. In such instances, a branch line from the delivery line to the main ram assembly is provided to the side of the double acting cylinder-piston unit to supplement the force applied to the extrusion machine plunger during a working stroke.

Various types of pumps are entirely suitable for incorporation in different embodiments of the invention. Not only have reciprocating piston types been very successfully employed, but also rotating vane pumps have been quite successful. In every instance, as already discussed, it is essential for the purposes of this invention to employ positive displacement pumps. The pressure controllers associated with the pumps can be any of several different varieties, but are generally of the by-pass type.

It will be quite apparent that the sizes of lines employed can be varied appreciably but should of course be sufficiently large to readily accommodate the necessary flow of hydraulic liquid without high frictional losses in comparison to the force to be applied to the main ram or the supplemental rams. The reservoir mentioned in the description of specific embodiments is not absolutely essential, especially if an extensive length of hydraulic liquid line is provided. In such instances, the lines themselves can be considered, in effect as a reservoir. If no explicit reservoir vessel is provided, it will be seen that the low pressure return line is an extension of the low pressure manifold.

The hydraulic liquid employed can be a hydraulic oil, a relatively high density organic solvent or liquid, or a water system. The water systems are generally preferred because of the fact that water has a lower compressability than organic materials. On the other hand, in environments in which a water leak would be detrimental because of the types of chemicals being processed, oil or inert organic materials may be preferred for the hydraulic liquid.

Having described the invention and preferred embodiments thereof, what is desired to be claimed is as follows:

1. A hydraulic drive system for cyclic operation of a reciprocable element of an apparatus such as an extrusion machine or the like, said element requiring relatively low force strokes and relatively high force strokes, comprising; a main hydraulic ram of relatively large cross section, at least one supplemental hydraulic ram of relatively small cross section, said rams being aligned in parallel and capable of operatively engaging the reciprocable element, and each having a supply line for flow of hydraulic liquid to and from the respective ram, a first and a second positive displacement pump, each having a delivery line and a feed line and a delivery pressure controller, an accumulator and a line connecting said accumulator to the second pump delivery line, a high pressure manifold, a low pressure manifold, a check valve means in the second pump delivery line between the accumulator line and the high pressure manifold, and four-way valve means connecting the high pressure manifold, the low pressure manifold, and the supply lines to the rams, said valve means providing concurrently a conduit between the high pressure manifold and one ram supply line, and a conduit between the low pressure manifold and the other ram supply line, the first pump providing an available delivery pressure relatively greater than the delivery pressure of the second pump, whereby the delivery volume of both pumps is cumulatively fed to said high pressure manifold during strokes requiring actuating pressures below the available delivery pressure of the second pump, and the delivery volume of the second pump is accumulated in said accumulator during plunger strokes requiring actuating pressures above the available delivery pressure of the second pump.

2. A hydraulic drive system for cyclic operation of a reciprocable element of an apparatus such as an extrusion machine or the like, said element requiring relatively low force strokes and relatively high force strokes, comprising; a main hydraulic ram capable of operatively engaging the plunger for providing relatively high force strokes in a forward direction, and having a supply line for flow of hydraulic liquid to and from the ram, at least one double acting cylinder-piston unit in parallel alignment with the main ram and operatively engaging the plunger for applying force for strokes in the forward and reverse directions, and having a feeding line to supply liquid for forward strokes, said line branching from the supply line to the main ram, and a supply line to supply liquid during reverse strokes, a first and second positive displacement pump, each having a delivery line, a feed line, and a delivery pressure controller of the by-pass type, the second pump being controlled to deliver at a lower maximum pressure than the first pump, an accumulator and an accumulator line connecting it to the second pump delivery line, a high pressure manifold, connecting to the pump delivery lines, a low pressure manifold connecting to the pump feed lines, a check valve in the second pump delivery line between the accumulator line and the high pressure manifold, and four-way valve means connecting the high pressure manifold, the low pressure manifold, and the supply lines, said valve means providing concurrently a conduit between the high pressure manifold and one supply line and the low pressure manifold and the other supply line, and further valve means in the supply line to the ram, said valve means being positioned between the ram and the feeding line to the double acting cylinder-piston unit, so that supply of hydraulic liquid to the ram can be interrupted during strokes requiring only low force strokes, and the delivery volume of both pumps is cumulatively fed to said high pressure manifold during low force strokes requiring pressures below the maximum available pressure from the second pump, and the delivery volume of the second pump is accumulated in said accumulator during strokes requiring pressures above the maximum delivery pressures of the second pump.

3. A hydraulic drive system for cyclic operation of a reciprocable element of an apparatus such as an extrusion machine or the like, said element requiring low force strokes and high force strokes, comprising; a main hydraulic ram of relatively large cross section, at least one supplemental hydraulic ram of relatively small cross section, said rams being aligned in parallel and operatively engaging the reciprocable element for applying movement thereof in opposite directions, and each having a supply line for flow of hydraulic liquid to and from the respective ram, a positive displacement pump providing a low rate of flow at a high pressure and a higher rate of flow at a low pressure, the pump having a delivery line and a feed line and a maximum delivery pressure controller, a high pressure manifold and a low pressure manifold, and four way valve means connecting the high pressure manifold, the low pressure manifold, and the supply lines to the rams, said valve means providing concurrently a conduit between the high pressure manifold and one ram supply line and a conduit leading to the low pressure manifold from the other ram supply line, whereby a high rate of flow is supplied to the supplemental ram at a low pressure and a low rate of flow is supplied to the main ram at a higher pressure.

4. A hydraulic drive system for cyclic operation of a reciprocable element of an apparatus such as an extrusion machine or the like, said element requiring low force strokes and high force strokes, comprising; a main hydraulic ram capable of operatively engaging the plunger for providing high force strokes in a forward direction, and having a supply line for flow of hydraulic liquid to and from the ram, at least one double acting cylinder-piston unit in parallel alignment with the main ram and operatively engaging the plunger for applying force for strokes in the forward and reverse directions, and having a feeding line to supply liquid for forward strokes, said line branching from the supply line to the main ram, and a supply line to supply liquid during reverse strokes, a positive displacement pump providing a low rate of flow at a high pressure and a higher rate of flow at a lower pressure, the pump having a delivery line and a feed line, a high pressure manifold and a low pressure manifold, four way valve means providing concurrently a conduit between the high pressure manifold and one supply line and the low pressure manifold and the other supply line, and further valve means in the supply line to the ram, said valve being positioned between the ram and the feeding line to the double acting cylinder-piston unit, so that supply of hydraulic liquid to the ram can be interrupted during strokes requiring only low force strokes, and the delivery volume of the pump is high during low force strokes of the cylinder piston unit, and the delivery volume of the pump is low during delivery to the ram for high force strokes.

References Cited in the file of this patent

UNITED STATES PATENTS

| | | |
|---|---|---|
| 1,982,711 | Vickers | Dec. 4, 1934 |
| 2,454,893 | Stacy | Nov. 30, 1948 |
| 2,511,883 | Thierry | June 20, 1950 |
| 2,585,297 | Beuscher | Feb. 12, 1952 |
| 2,774,436 | Ferris | Dec. 18, 1956 |
| 2,912,827 | Thomas | Nov. 17, 1959 |

FOREIGN PATENTS

| | | |
|---|---|---|
| 382,244 | Great Britain | Oct. 20, 1932 |